United States Patent
Suzuki

(10) Patent No.: US 10,277,779 B2
(45) Date of Patent: Apr. 30, 2019

(54) INFORMATION PROCESSING DEVICE, IMAGE READING APPARATUS, INFORMATION PROCESSING SYSTEM, AND NON-TRANSITORY COMPUTER READABLE MEDIUM FOR ENHANCED SECURITY FOR AUTHENTICATION

(71) Applicant: FUJI XEROX CO., LTD., Tokyo (JP)

(72) Inventor: Takayuki Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/687,897

(22) Filed: Aug. 28, 2017

(65) Prior Publication Data

US 2018/0270393 A1 Sep. 20, 2018

(30) Foreign Application Priority Data

Mar. 17, 2017 (JP) .................. 2017-052823

(51) Int. Cl.
- *G06F 3/12* (2006.01)
- *H04N 1/44* (2006.01)
- *H04N 1/00* (2006.01)

(52) U.S. Cl.
CPC ....... *H04N 1/4426* (2013.01); *H04N 1/00344* (2013.01); *H04N 1/4413* (2013.01); *H04N 2201/0081* (2013.01)

(58) Field of Classification Search
CPC .... G06F 3/1204; G06F 3/1238; G06F 3/1222; G06F 3/1254; G06F 3/1286; H04N 1/4425; H04N 1/00344; H04N 1/4413; H04N 2201/0081

USPC .......... 358/1.1–1.18, 402; 709/203
See application file for complete search history.

(56) References Cited

U.S. PATENT DOCUMENTS

| | | | | |
|---|---|---|---|---|
| 2014/0181916 A1* | 6/2014 | Koo | ............... | H04W 12/08 726/4 |
| 2014/0258709 A1* | 9/2014 | Takeda | ............... | H04L 63/0823 713/156 |
| 2014/0313539 A1 | 10/2014 | Kawano | | |
| 2015/0015908 A1* | 1/2015 | Tanaka | ............... | G06K 15/4095 358/1.14 |
| 2015/0058936 A1* | 2/2015 | Kang | ............... | H04L 63/08 726/4 |

(Continued)

FOREIGN PATENT DOCUMENTS

| | | |
|---|---|---|
| JP | 2000-10927 A | 1/2000 |
| JP | 2013-109616 A | 6/2013 |

*Primary Examiner* — Gabriel I Garcia
(74) *Attorney, Agent, or Firm* — Oliff PLC

(57) ABSTRACT

An information processing device includes an accepting unit, a first transmitting unit, a receiving unit, an acquiring unit, and a second transmitting unit. The accepting unit receives identification information used by a cloud service for identifying a user and authentication information used for authenticating the user. The first transmitting unit transmits the identification information and the authentication information to the cloud service via a first line. The receiving unit receives a message transmitted to the information processing device from the cloud service via a second line. The acquiring unit acquires unique information contained in the message. The second transmitting unit transmits the unique information to the cloud service via the first line in a case where the message is transmitted by the cloud service due to transmission by the first transmitting unit.

9 Claims, 10 Drawing Sheets

(56) References Cited

U.S. PATENT DOCUMENTS

2015/0092221 A1* 4/2015 Ochi ................ G06F 3/1222
358/1.14

* cited by examiner

721

| USER ID | PASSWORD | DEVICE ID |
|---------|----------|-----------|
| U01 | Pw11 | A31 |
| U02 | Pw12 | A32 |
| U03 | Pw13 | A33 |
| U04 | Pw14 | A34 |
| ⋮ | ⋮ | ⋮ |

722

| TIME | DEVICE ID | UNIQUE INFORMATION |
|------|-----------|--------------------|
| T91 | A31 | P41 |
| T92 | A32 | P42 |
| T93 | A33 | P43 |
| T94 | A34 | P44 |
| ⋮ | ⋮ | ⋮ |

| USER ID | U01 |
|---|---|
| PASSWORD | Pw11 |
| CLOUD ID | Cs21 |
| ⋮ | ⋮ |

| TIME | USER ID | CLOUD ID |
|---|---|---|
| ⋯ | U01 | Cs21 |
| ⋯ | U02 | Cs22 |
| ⋮ | ⋮ | ⋮ |

# INFORMATION PROCESSING DEVICE, IMAGE READING APPARATUS, INFORMATION PROCESSING SYSTEM, AND NON-TRANSITORY COMPUTER READABLE MEDIUM FOR ENHANCED SECURITY FOR AUTHENTICATION

CROSS-REFERENCE TO RELATED APPLICATIONS

This application is based on and claims priority under 35 USC 119 from Japanese Patent Application No. 2017-052823 filed Mar. 17, 2017.

BACKGROUND

Technical Field

The present invention relates to information processing devices, image reading apparatuses, information processing systems, and non-transitory computer readable media.

SUMMARY

According to an aspect of the invention, there is provided an information processing device including an accepting unit, a first transmitting unit, a receiving unit, an acquiring unit, and a second transmitting unit. The accepting unit receives identification information used by a cloud service for identifying a user and authentication information used for authenticating the user. The first transmitting unit transmits the identification information and the authentication information to the cloud service via a first line. The receiving unit receives a message transmitted to the information processing device from the cloud service via a second line. The acquiring unit acquires unique information contained in the message. The second transmitting unit transmits the unique information to the cloud service via the first line in a case where the message is transmitted by the cloud service due to transmission by the first transmitting unit.

BRIEF DESCRIPTION OF THE DRAWINGS

An exemplary embodiment of the present invention will be described in detail based on the following figures, wherein.

DETAILED DESCRIPTION

Figure 1:
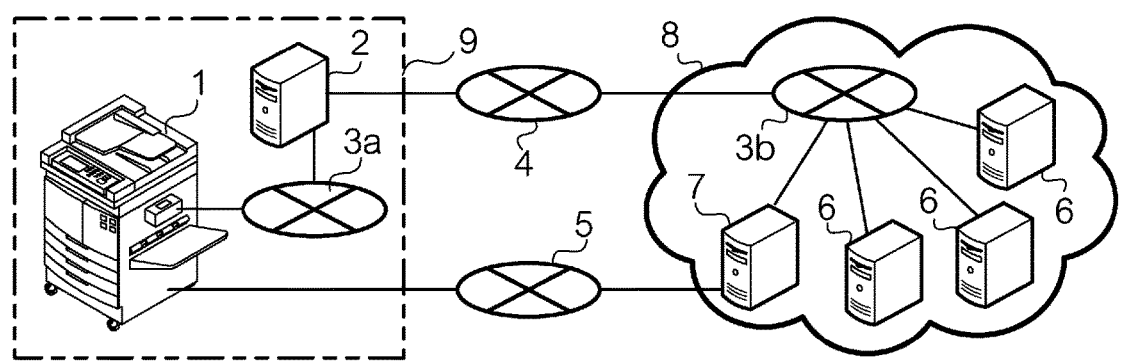
FIG. 1 illustrates the configuration of an information processing system according to an exemplary embodiment.

1. Exemplary Embodiment 1.1. Overall Configuration of Information Processing System FIG. 1 illustrates the configuration of an information processing system 9 according to an exemplary embodiment. The information processing system 9 has a communication line 3a that forms, for example, a local area network (LAN), an image reading apparatus 1 connected to the communication line 3a, and a server apparatus 2.

The server apparatus 2 shown in FIG. 1 receives a processing request from the image reading apparatus 1 via the communication line 3a, and also receives, for example, authentication information to be used by the image reading apparatus 1 for using a service (referred to as "cloud service") provided by a cloud 8.

In a case where the server apparatus 2 receives, for example, the authentication information from the image reading apparatus 1, the server apparatus 2 transmits the authentication information to the cloud 8 via a communication line 4 that forms a wide area network (WAN), such as the Internet, and uses the aforementioned cloud service when the authentication is successful. The server apparatus 2 included in the information processing system 9 may be a single server apparatus as shown in FIG. 1 or may be multiple server apparatuses. Furthermore, the cloud 8 connected to the server apparatus 2 via the communication line 4 may be a single cloud as shown in FIG. 1 or may be multiple clouds.

The server apparatus 2 may function as a gateway apparatus that establishes, for example, a firewall that has stricter conditions for receiving information than the conditions for transmitting information via the communication line 4.

The image reading apparatus 1 shown in FIG. 1 is an information processing apparatus that reads an image formed on a medium and that performs information processing using this image. The image reading apparatus 1 makes a request for predetermined processing to the server apparatus 2 and makes a command for receiving the cloud service with respect to the processing result from the cloud 8.

The image reading apparatus 1 receives identification information used by the cloud 8 for identifying a user and authentication information used for authenticating this user, and transmits these pieces of information to the server apparatus 2. Moreover, the image reading apparatus 1 reads an image formed on a medium, generates image data indicating this read image, and forwards the image data to the server apparatus 2. Then, for example, the image reading apparatus 1 requests the server apparatus 2 to perform an optical text recognition process for recognizing text from the image indicated by this forwarded image data.

The server apparatus 2 performs the optical text recognition process in response to the aforementioned request and recognizes text from the image indicated by the image data forwarded from the image reading apparatus 1. Then, the server apparatus 2 transmits, for example, the authentication information received from the image reading apparatus 1 to the cloud 8 via the communication line 4 so as to store the recognized text data into the cloud 8.

The cloud 8 is a system that provides the cloud service and has, for example, a communication line 3b that forms a LAN, multiple execution devices 6 connected to the communication line 3b, and an authentication device 7, as shown in FIG. 1. Alternatively, the cloud 8 may have only a single execution device 6. Moreover, the cloud 8 may have multiple authentication devices 7. The authentication device 7 authenticates a user who is using the cloud 8 from the information processing system 9. Each execution device 6 executes a process commanded by an authenticated user so as to provide the cloud service of the cloud 8 to the user.

The process requested to the server apparatus 2 from the image reading apparatus 1 is not limited to the optical text recognition process described above and may be, for example, a gray-level correction process to be performed on image information or a translation process to be performed on text information. Furthermore, the cloud service to be provided to the information processing system 9 from the cloud 8 is not limited to storing of text data described above and may be, for example, a process, such as a statistical process, an inference process, an arithmetic process, a graph generating process, or a sound synthesis process.

1.2. Configuration of Execution Device

Figure 2:
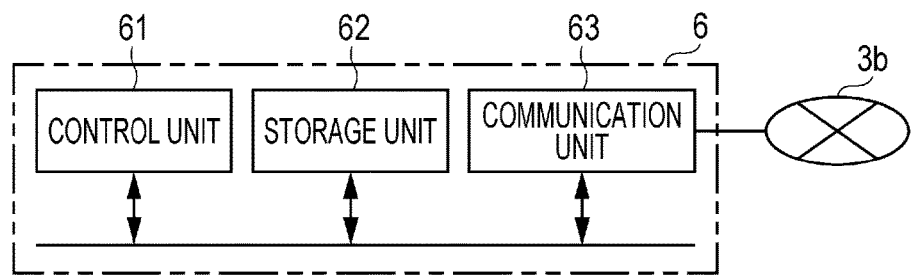
FIG. 2 illustrates an example of the configuration of an execution device.

FIG. 2 illustrates an example of the configuration of each execution device 6. Each execution device 6 has a control unit 61, a storage unit 62, and a communication unit 63. The execution device 6 may also have a display unit that displays an image and an operation unit that receives an operation.

The control unit 61 has a central processing unit (CPU), a read-only memory (ROM), and a random access memory (RAM). The CPU reads and executes computer programs (simply referred to as "programs" hereinafter) stored in the ROM and the storage unit 62 so as to control each unit of the execution device 6.

The storage unit 62 is a large-capacity storage unit, such as a solid state drive or a hard disk drive, and stores various types of programs to be read by the CPU of the control unit 61.

The communication unit 63 is a communication circuit connected to the communication line 3b in a wireless or wired manner. The execution device 6 uses the communication unit 63 to exchange information with the authentication device 7 via the communication line 3b.

The execution device 6 is controlled by the authentication device 7. When the authentication device 7 authenticates a user of the image reading apparatus 1 and receives a request for a process commanded by this user from the server apparatus 2, the execution device 6 executes the requested process and provides the cloud service to the user under the control of the authentication device 7.

1.3. Configuration of Authentication Device

Figures 3, 4A, 4B:
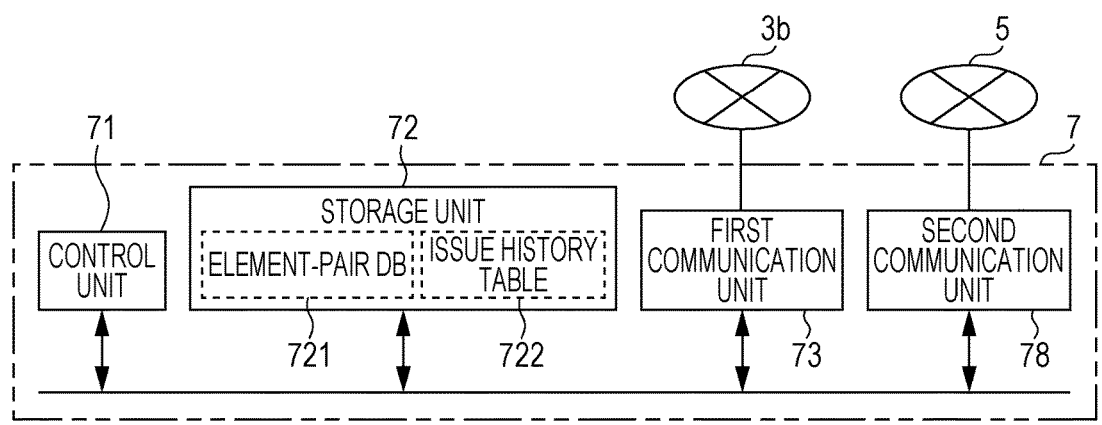
FIG. 3 illustrates an example of the configuration of an authentication device.
FIGS. 4A and 4B illustrate an example of information stored in a storage unit.

FIG. 3 illustrates an example of the configuration of the authentication device 7. The authentication device 7 has a control unit 71, a storage unit 72, a first communication unit 73, and a second communication unit 78. The authentication device 7 may also have a display unit that displays an image and an operation unit that receives an operation.

The control unit 71 has a CPU, a ROM, and a RAM. The CPU reads and executes programs stored in the ROM and the storage unit 72 so as to control each unit of the authentication device 7.

The first communication unit 73 is a communication circuit connected to the communication line 3b in a wireless or wired manner. The authentication device 7 uses the first communication unit 73 to control each execution device 6 via the communication line 3b. The first communication unit 73 is connected to the communication line 4 via the communication line 3b and exchanges information with the server apparatus 2 of the information processing system 9.

The second communication unit 78 is a communication circuit connected to a communication line 5, such as a telephone line, different from the communication line 4. The authentication device 7 uses the second communication unit 78 to exchange information with the image reading apparatus 1 of the information processing system 9 via the communication line 5.

The storage unit 72 is a large-capacity storage unit, such as a hard disk drive, and stores various types of programs to be read by the CPU of the control unit 71. The storage unit 72 may also store information indicating the processing loads of the multiple execution devices 6 included in the cloud 8. The control unit 71 may monitor the processing loads of the multiple execution devices 6 and store the information about the monitored processing loads into the storage unit 72. Based on this processing-load information, the control unit 71 may select one of the execution devices 6 that is to execute the process commanded by the user.

The storage unit 72 stores an element-pair database (DB) 721 and an issue history table 722. FIGS. 4A and 4B illustrate an example of information stored in the storage unit 72. FIG. 4A illustrates an example of the element-pair DB 721. The element-pair DB 721 is a database that stores two elements used in two-step authentication as a pair.

In the element-pair DB 721 shown in FIG. 4A, a "user ID" as identification information for identifying a user, a "password" as information known only to the user, and a "device ID" as identification information for identifying a device owned by the user are stored in association with one another. In a case where this device uses the telephone line, the device ID may be the telephone number used on this telephone line.

For example, in the element-pair DB 721 shown in FIG. 4A, a user ID "U01" is associated with a password "Pw11" and a device ID "A31".

Two-step authentication involves the use of two elements as a pair. The two elements are different types of information for verifying a user. The types of elements used in two-step authentication include, for example, information known to the user (memorized information), information of an object owned by the user (possession information), and physical characteristics of the user (biological information). In two-step authentication, two different types are selected from the above-mentioned multiple types of information for the two elements forming a pair.

Memorized information is, for example, a password. Biological information is, for example, a fingerprint, a voice print, or an iris pattern. Possession information is, for example, the telephone number of a portable telephone owned by the user. In the element-pair DB 721 shown in FIG. 4A, a password as memorized information and a device ID as possession information are associated with each user ID.

The authentication device 7 receives identification information used for identifying a user and authentication information used for authenticating the user from the information processing system 9 via the communication line 4.

The authentication device 7 authenticates the user by searching for the received identification information and the received authentication information from the contents stored in the element-pair DB 721. This authentication will be referred to as "first authentication".

In a case where the user employs two-step authentication in the cloud 8 for achieving enhanced security, when the first authentication described above is successful, the authentication device 7 generates information unique to this first authentication (referred to as "unique information").

Then, the authentication device 7 transmits a message containing the generated unique information toward the device owned by the user via the communication line 5, such as a telephone line, which is different from the communication line 4. The transmission of this message will be referred to as "issue".

The unique information is a so-called one-time password and is, for example, a personal identification number (PIN) code. The device owned by the user is identified by using the device ID associated with the user ID in the element-pair DB 721. When the authentication device 7 issues the message containing the unique information toward the device owned by the user, the authentication device 7 stores the issued contents into the issue history table 722.

In a case where the communication line 5 is a telephone line and the device ID is a telephone number allocated to the device identified based on that device ID, the aforementioned message may be transmitted in the form of, for example, a short message service (SMS) or a speech signal.

FIG. 4B illustrates an example of the issue history table 722. In the issue history table 722, "time" indicating the time and date on which the message is issued by the authentication device 7, "device ID" as the identification information of the device, which is the destination of the message, and "unique information" contained in the message are stored in association with one another.

When the authentication device 7 receives the identification information used for identifying the user and the authentication information used for authenticating the user from the information processing system 9, the authentication device 7 may specify, in the communication line 4, identification information of the apparatus (i.e., the transmission source) that has transmitted these pieces of information. The transmission source is the server apparatus 2 in the above-described example, and the identification information of the transmission source is, for example, an Internet Protocol (IP) address of the server apparatus 2. In this case, the authentication device 7 may record this transmission-source identification information into the issue history table 722 in association with the unique information. Moreover, the authentication device 7 may include this transmission-source identification information in the aforementioned message.

In the example of the issue history table 722 shown in FIG. 4B, it is indicated that a message containing unique information "P41" has been transmitted toward a device identified based on a device ID "A31" at time "T91".

A validity period is preliminarily set for the unique information. The unique information is generated using, for example, pseudo-random numbers with time information as a seed such that the amount of information is enough so as not to be identifiable by others excluding the user within this validity period.

The control unit 71 reads the issue history table 722 stored in the storage unit 72 at, for example, a predetermined cycle, refers to the time written in the issue history table 722, and deletes expired unique information from the issue history table 722.

When the authentication device 7 receives the unique information from the information processing system 9 via the first communication unit 73, the communication line 3*b*, and the communication line 4, the authentication device 7 compares the received unique information with the unique information contained in the issued message so as to authenticate the user. This authentication will be referred to as "second authentication".

With the validity period set for the unique information, if the unique information is transmitted back within this period, the authentication device 7 regards that the user who has returned this unique information and the user owning the device that has transmitted the unique information are the same.

Specifically, the authentication device 7 authenticates a user by performing first authentication using memorized information and second authentication using possession information. This configuration achieves enhanced security for authentication, as compared with a case where only either one of first authentication and second authentication is used.

1.4. Configuration of Server Apparatus

Figures 5, 6A, 6B:
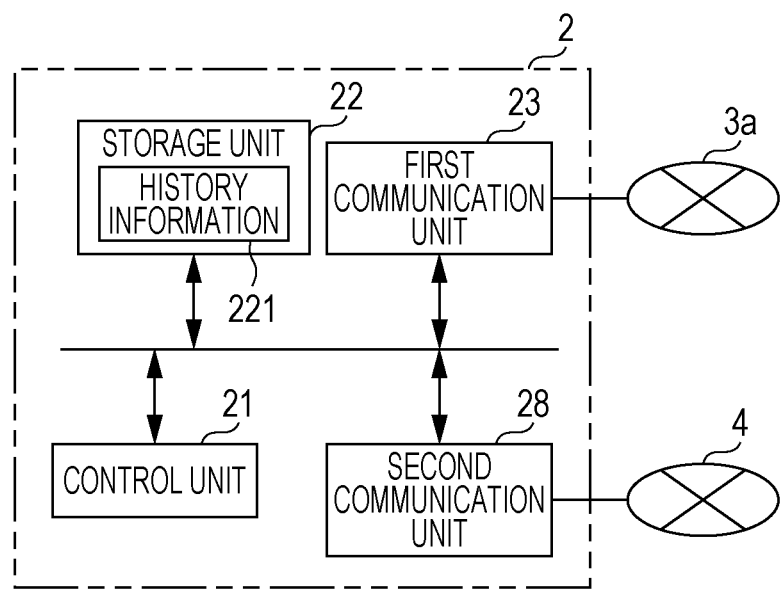
FIG. 5 illustrates an example of the configuration of a server apparatus.
FIGS. 6A and 6B illustrate an example of history information.

FIG. 5 illustrates an example of the configuration of the server apparatus 2. The server apparatus 2 has a control unit 21, a storage unit 22, a first communication unit 23, and a second communication unit 28. The server apparatus 2 may also have a display unit that displays an image and an operation unit that receives an operation.

The control unit 21 has a CPU, a ROM, and a RAM. The CPU reads and executes programs stored in the ROM and the storage unit 22 so as to control each unit of the server apparatus 2.

The first communication unit 23 is a communication circuit connected to the communication line 3*a* in a wireless or wired manner. The server apparatus 2 uses the first communication unit 23 to exchange information with the image reading apparatus 1 via the communication line 3*a*.

The second communication unit 28 is a communication circuit connected to the communication line 4 in a wireless or wired manner. The server apparatus 2 uses the second communication unit 28 to exchange information with the cloud 8 via the communication line 4.

The storage unit 22 is a large-capacity storage unit, such as a hard disk drive, and stores various types of programs to be read by the CPU of the control unit 21. The storage unit 22 stores history information 221.

FIGS. 6A and 6B illustrate an example of the history information 221. In the history information 221, a user ID and a password that have been received by the image reading apparatus 1, forwarded to the server apparatus 2, and transmitted to the cloud 8 via the communication line 4 are stored together with a cloud ID as identification information of the cloud 8. The information stored in the history information 221 indicates the history of transmission of user IDs and passwords from the server apparatus 2 to the cloud 8.

In the history information 221 shown in FIG. 6A, the history of a preceding transmission process is stored. According to the history information 221 shown in FIG. 6A, it is recorded that the user identified based on the user ID "U01" has input the password "Pw11" together with the user ID and that the user ID and the password have been transmitted by the server apparatus 2 to the cloud 8 identified based on the cloud ID "Cs21". Information indicating the time of the aforementioned transmission may also be recorded in this history information 221.

Furthermore, in the history information 221 shown in FIG. 6B, the history of multiple transmission processes is stored. In the history information 221 shown in FIG. 6B, a transmitted user ID and a cloud ID of the cloud 8 as a transmission destination are recorded for each piece of information indicating the time of transmission thereof.

The data recorded in the history information 221 may be deleted by the control unit 21 when a predetermined period elapses from the time of recording or may be "disabled" by being associated with information indicating that the data is disabled.

1.5. Configuration of Image Reading Apparatus

Figure 7:
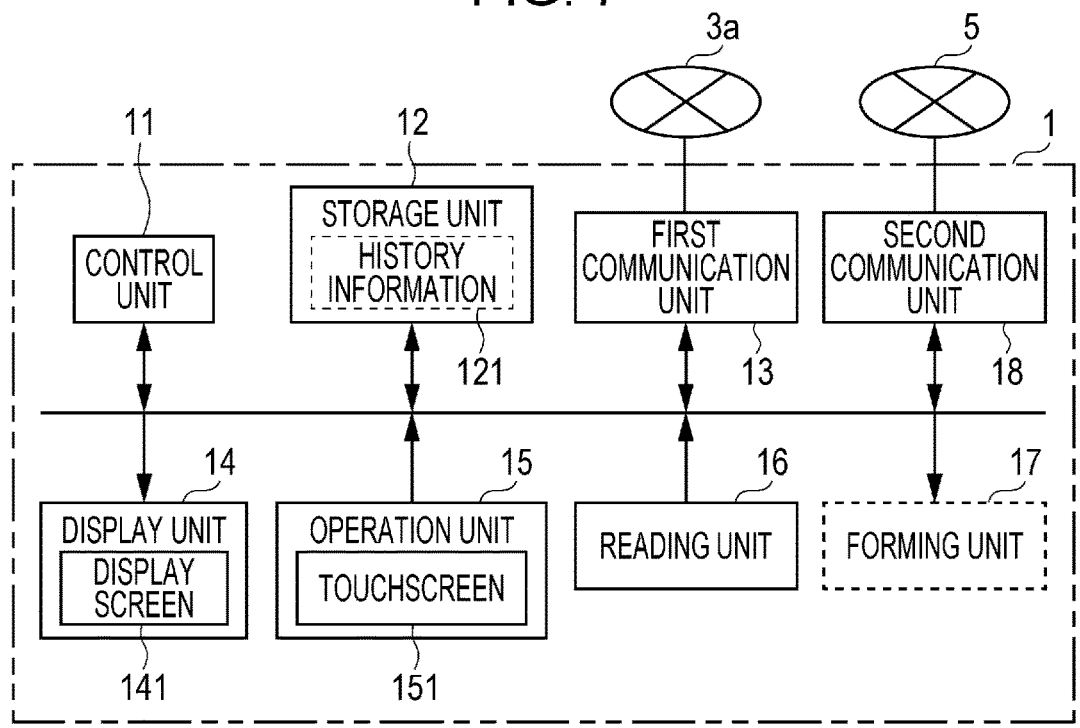
FIG. 7 illustrates the configuration of an image reading apparatus.

FIG. 7 illustrates the configuration of the image reading apparatus 1. The image reading apparatus 1 has a control unit 11, a storage unit 12, a first communication unit 13, a display unit 14, an operation unit 15, a reading unit 16, and a second communication unit 18. The image reading apparatus 1 may also have a forming unit 17 indicated by a dash line in FIG. 7.

The control unit 11 has a CPU, a ROM, and a RAM. The CPU reads and executes programs stored in the ROM and the storage unit 12 so as to control each unit of the image reading apparatus 1.

The storage unit 12 is a large-capacity storage unit, such as a solid state drive or a hard disk drive, and stores various types of programs to be read by the CPU of the control unit 11.

The storage unit 12 may store therein history information 121 corresponding to the above-described history information 221. In a case where the storage unit 12 stores the history information 121 therein, the storage unit 22 of the server apparatus 2 does not have to store the history information 221 therein.

The first communication unit 13 is a communication circuit connected to the communication line 3a in a wireless or wired manner. The image reading apparatus 1 uses the first communication unit 13 to exchange information with the server apparatus 2 via the communication line 3a.

The second communication unit 18 is a communication circuit connected to the communication line 5, which is different from the communication line 4. The image reading apparatus 1 uses the second communication unit 18 to receive information from the cloud 8 via the communication line 5.

The operation unit 15 includes operators, such as operation buttons, for making various kinds of commands, receives an operation from a user, and supplies a signal according the operation contents to the control unit 11. Furthermore, the operation unit 15 has a touchscreen 151 that detects an operational body, such as a user's finger or a stylus pen. When using the image reading apparatus 1, the user may transmit user's identification information or authentication information to the control unit 11 via the operation unit 15. Furthermore, the operation unit 15 may have a device, such as a card reader, for acquiring user's identification information or authentication information.

The display unit 14 has a display screen 141, such as a liquid crystal display, and displays an image under the control of the control unit 11. The touchscreen 151, which is transparent, of the operation unit 15 is disposed over the display screen 141.

The reading unit 16 optically reads a medium. The reading unit 16 includes an imaging element, such as a charge coupled device (CCD). The reading unit 16 reads an image formed on a medium and generates image data indicating this image.

The forming unit 17 forms an image based on image data. For example, the forming unit 17 forms an image onto a medium, such as a sheet, based on an electrophotographic method or a thermal transfer method.

Figure 8:
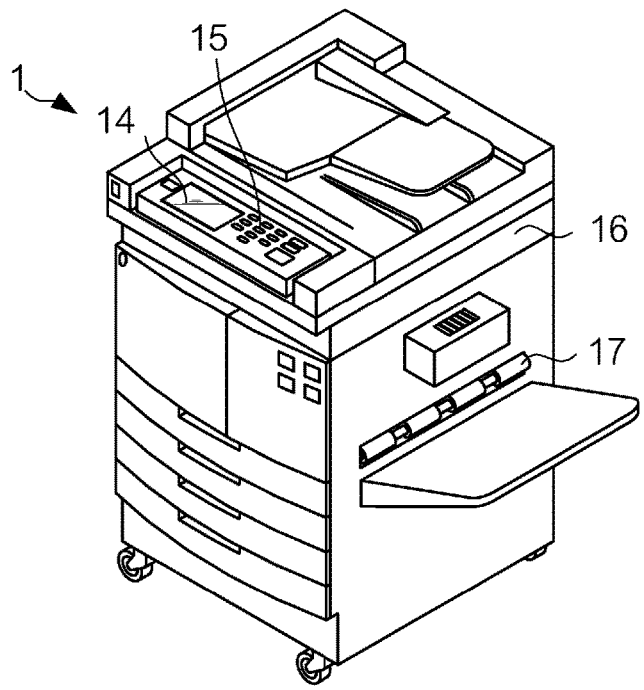
FIG. 8 is an external view of the image reading apparatus.

FIG. 8 is an external view of the image reading apparatus 1. The image reading apparatus 1 shown in FIG. 8 has a body disposed at an upper portion thereof and having a reading surface (not shown) of the reading unit 16 protected with, for example, glass, and also has a sheet feeder attached to the body in an openable-closable manner by using a hinge. The sheet feeder continuously feeds media to the reading surface. The sheet feeder has the display unit 14 and the operation unit 15.

The user sets multiple media having images formed thereon into the sheet feeder in a closed state and operates the operation unit 15 so as to cause the image reading apparatus 1 to successively read the images formed on these multiple media. Moreover, the user opens the sheet feeder and sets a single medium directly on the reading surface so as to cause the image reading apparatus 1 to read the image formed on this medium.

The body has the forming unit 17. The forming unit 17 has a container that contains sheets as media cut to a predetermined size, fetches the sheets one by one from the container by using a transport roller in response to a command from the control unit 11, and forms an image onto each of these sheets by transferring the image formed on, for example, a photoconductor and a transfer belt. The media are not limited to paper sheets and may be, for example, resinous sheets. In other words, the media may be of any type so long as images are recordable on the surfaces thereof.

1.6. Functional Configuration of Information Processing System

Figure 9:
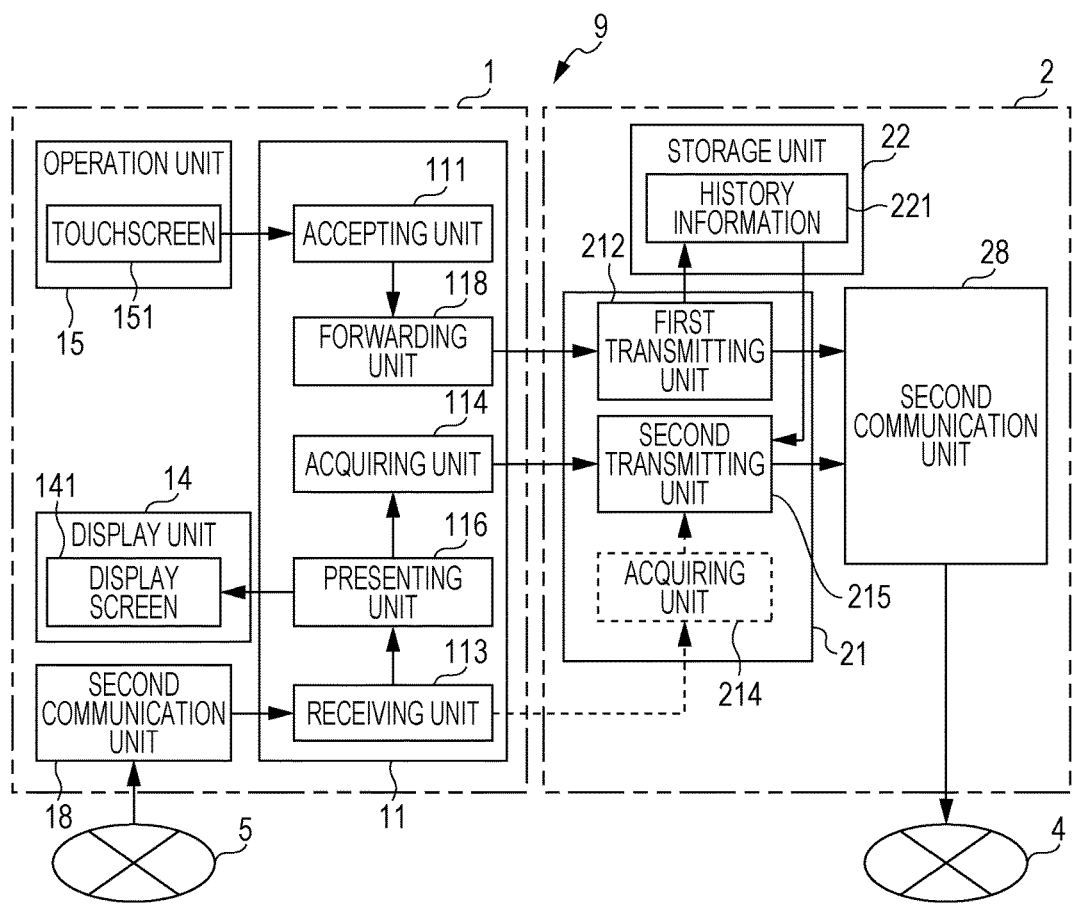
FIG. 9 illustrates a functional configuration of the image reading apparatus and the server apparatus.

FIG. 9 illustrates a functional configuration of the image reading apparatus 1 and the server apparatus 2 in the information processing system 9. In FIG. 9, the first communication unit 13, the first communication unit 23, and the communication line 3a that connect the image reading apparatus 1 and the server apparatus 2 are not shown. Moreover, in FIG. 9, the storage unit 12, the reading unit 16, and the forming unit 17 are also not shown.

The control unit 11 of the image reading apparatus 1 shown in FIG. 9 executes a program stored in the storage unit 12 shown in FIG. 7 so as to function as an accepting unit 111, a receiving unit 113, an acquiring unit 114, a presenting unit 116, and a forwarding unit 118.

The control unit 21 of the server apparatus 2 shown in FIG. 9 executes a program stored in the storage unit 22 shown in FIG. 5 so as to function as a first transmitting unit 212 and a second transmitting unit 215. The control unit 21 may also function as an acquiring unit 214 indicated by a dash line in FIG. 9.

The accepting unit 111 receives information indicated by an operation performed on the touchscreen 151 by the user. The accepting unit 111 receives, via this touchscreen 151, identification information used by the cloud 8 for identifying the user and authentication information used for authenticating the user.

The forwarding unit 118 forwards the identification information and the authentication information received by the accepting unit 111 to the server apparatus 2.

The first transmitting unit 212 uses the communication line 4 (first line) to transmit the identification information and the authentication information forwarded from the image reading apparatus 1 to the cloud 8 via the second communication unit 28. Then, the first transmitting unit 212 records this transmission history in the history information 221.

The receiving unit 113 uses the communication line 5 (second line) to receive a message transmitted to the image reading apparatus 1 from the cloud 8 via the second communication unit 18.

The presenting unit 116 causes the display screen 141 of the display unit 14 to display an image based on the message received by the receiving unit 113.

The acquiring unit 114 acquires unique information contained in the message received by the receiving unit 113. In the example shown in FIG. 9, the format of the message transmitted by the cloud 8 is a format preregistered in the image reading apparatus 1 and is interpretable by the image reading apparatus 1. Therefore, the acquiring unit 114 shown in FIG. 9 performs a preregistered process so as to extract and acquire the unique information from the message received by the receiving unit 113.

The second transmitting unit 215 refers to the history information 221 so as to determine whether or not the message received by the receiving unit 113 has been transmitted by the cloud 8 due to transmission by the first transmitting unit 212.

For example, this determination may be performed by comparing the interval between the time at which the identification information and the authentication information are transmitted to the cloud 8 by the first transmitting unit 212 and the time at which the message transmitted by the cloud 8 is received by the receiving unit 113 with a threshold value. For example, if this interval is below the threshold value, the second transmitting unit 215 determines that the message received by the receiving unit 113 has been transmitted by the cloud 8 due to transmission by the first transmitting unit 212.

If the message transmitted by the cloud 8 contains a user ID, this determination may be performed by comparing the user ID contained in the message with the user ID recorded in the history information 221. For example, if the user ID contained in the message is identical to the user ID recorded in the history information 221, the second transmitting unit 215 determines that the message received by the receiving unit 113 has been transmitted by the cloud 8 due to transmission by the first transmitting unit 212.

If the second transmitting unit 215 determines that the message received by the receiving unit 113 has been transmitted by the cloud 8 due to transmission by the first transmitting unit 212, the second transmitting unit 215 uses the communication line 4 (first line) to transmit the unique information to the cloud 8 via the second communication unit 28.

1.7. Operation of Information Processing System

Figure 10:
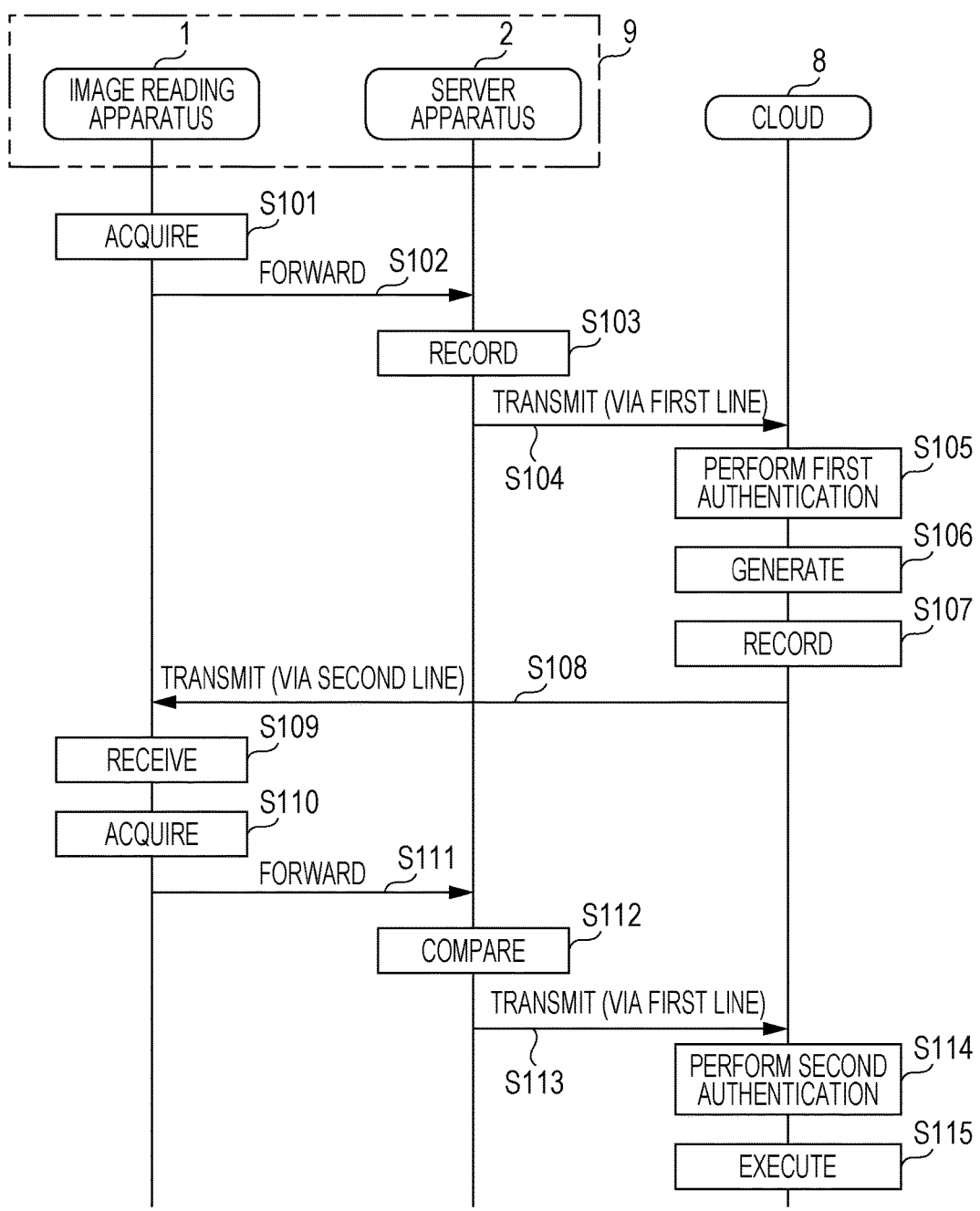
FIG. 10 is a sequence diagram illustrating the flow of operation performed by the information processing system.

FIG. 10 is a sequence diagram illustrating the flow of operation performed by the information processing system 9. When the control unit 11 of the image reading apparatus 1 receives a user ID (identification information) of a user and a password (authentication information) in step S101, the control unit 11 forwards these pieces of information to the server apparatus 2 in step S102.

The control unit 21 of the server apparatus 2 records the forwarded user ID, the forwarded password, and the cloud ID of the cloud 8 as a transmission destination for these pieces of information into the history information 221 in step S103, and then uses the communication line 4 to transmit the user ID and the password to the cloud 8 in step S104.

The control unit 71 of the authentication device 7 included in the cloud 8 refers to the element-pair DB 721 stored in the storage unit 72 so as to perform user authentication (first authentication) in step S105 based on the information transmitted from the server apparatus 2. If the identification information and the authentication information recorded in the element-pair DB 721 matches the information transmitted from the server apparatus 2, the first authentication is successful. When the first authentication is successful, the control unit 71 generates unique information corresponding to this first authentication in step S106 and then records the generated unique information into the issue history table 722 in step S107.

The control unit 71 reads a device ID associated with the aforementioned user ID in the element-pair DB 721. This device ID is, for example, the telephone number of the image reading apparatus 1. In this case, for example, the control unit 71 generates a message containing unique information by using a character string and transmits this message via the communication line 5 (second line) by using SMS in step S108.

When the control unit 11 of the image reading apparatus 1 receives the message from the authentication device 7 of the cloud 8 in step S109, the control unit 11 extracts and acquires the unique information from this message in step S110 and forwards the acquired unique information to the server apparatus 2 in step S111.

In step S112, the control unit 21 of the server apparatus 2 compares the contents recorded in the history information 221 with the message transmitted from the cloud 8. Then, if it is determined based on this comparison result that the message containing the unique information forwarded from the image reading apparatus 1 has been transmitted by the cloud 8 due to the transmission of the user ID and the password by the server apparatus 2 in step S103, the control unit 21 transmits the forwarded unique information to the cloud 8 via the communication line 4 (first line) in step S113.

When the control unit 71 of the authentication device 7 in the cloud 8 receives the unique information from the server apparatus 2, the control unit 71 refers to the issue history table 722 so as to perform user authentication (second authentication) in step S114 based on this unique information. If the unique information recorded in the issue history table 722 matches the unique information received from the server apparatus 2, the second authentication is successful. When the second authentication is successful, the control unit 71 receives a processing request from the information processing system 9, selects one of the execution devices 6, and causes the selected execution device 6 to execute the requested process in step S115.

As a result of this operation, the information processing system 9 uses the image reading apparatus 1 as an apparatus owned by the user to perform the two-step authentication provided by the cloud 8, thereby simplifying the operation for performing the two-step authentication and reducing the load on the user.

Furthermore, since the image reading apparatus 1 includes the reading unit 16 that may be too heavy to be readily carried by a person, there is a lower risk of the image reading apparatus 1 being stolen as compared with, for example, a portable telephone. Therefore, the degree of guarantee of possession by the user may be higher for the image reading apparatus 1 than, for example, a portable telephone.

2. Modifications

Although the exemplary embodiment has been described above, the exemplary embodiment may be modified as follows. Moreover, the following modifications may be combined.

2.1. First Modification

Although the information processing system 9 described in the above exemplary embodiment has the image reading apparatus 1 and the server apparatus 2 that are connected by the communication line 3a, the server apparatus 2 may be omitted.

Figure 11:
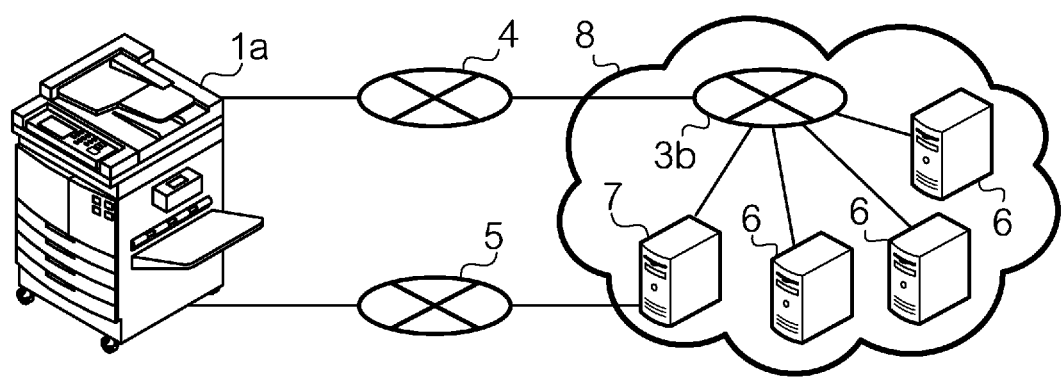
FIG. 11 illustrates an image reading apparatus.

FIG. 11 illustrates an image reading apparatus 1a that communicates with the cloud 8 via the communication line 4 and the communication line 5. In place of the first communication unit 13 shown in FIG. 7, the image reading apparatus 1a has a first communication unit 13a connected to the communication line 4. Furthermore, in place of the control unit 11 shown in FIG. 7, the image reading apparatus 1a has a control unit 11a.

Figure 12:
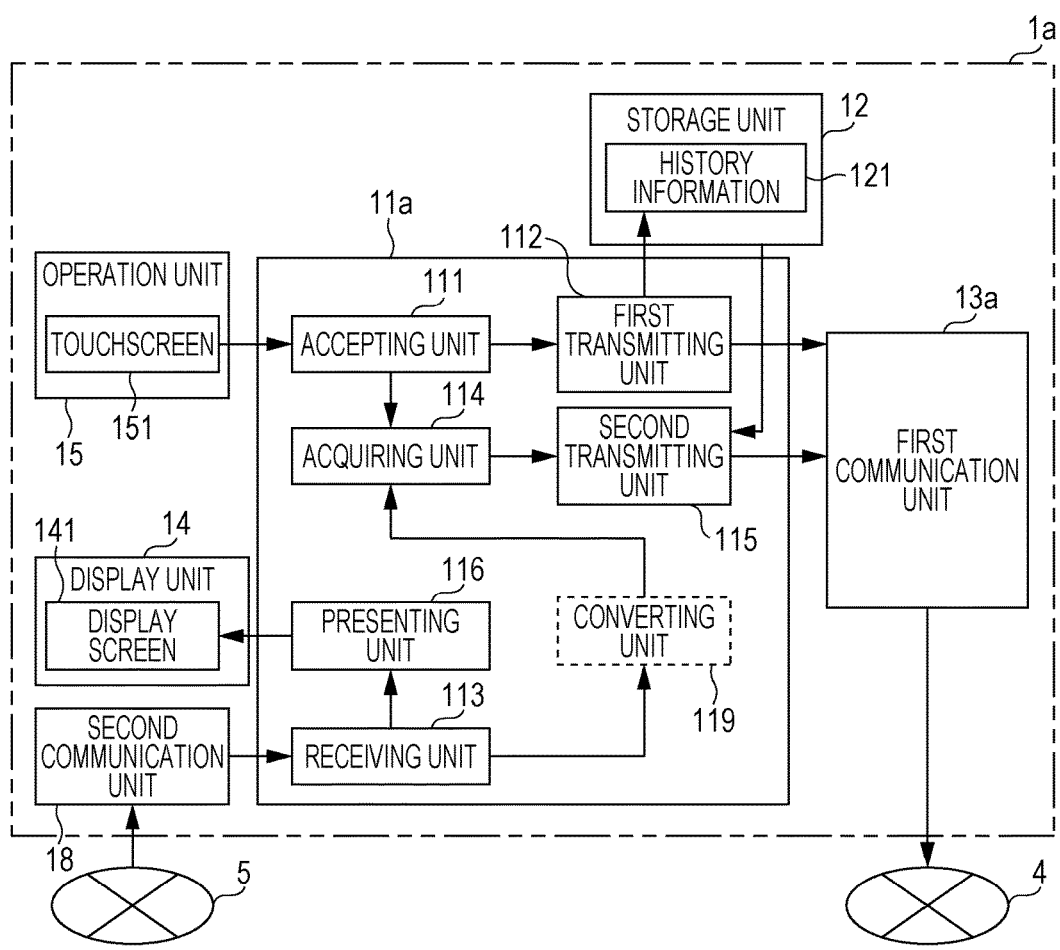
FIG. 12 illustrates an example of a functional configuration of a control unit of the image reading apparatus.

FIG. 12 illustrates an example of a functional configuration of the control unit 11a of the image reading apparatus 1a. The control unit 11a executes a program stored in the storage unit 12 so as to function as an accepting unit 111, a first transmitting unit 112, a receiving unit 113, an acquiring unit 114, a second transmitting unit 115, and a presenting unit 116.

The descriptions of the functions of the accepting unit 111, the receiving unit 113, the acquiring unit 114, and the presenting unit 116 will be omitted since they are the same as the functions of those in the control unit 11 shown in FIG. 9.

The first transmitting unit 112 uses the communication line 4 (first line) to transmit the identification information and the authentication information received by the accepting unit 111 to the cloud 8 via the first communication unit 13a. Then, the transmission history is recorded in the history information 121 of the storage unit 12.

The second transmitting unit 115 refers to the history information 121 so as to determine whether or not the message received by the receiving unit 113 has been transmitted by the cloud 8 due to transmission by the first transmitting unit 112.

For example, this determination may be performed by comparing the interval between the time at which the identification information and the authentication information are transmitted to the cloud 8 by the first transmitting unit 112 and the time at which the message transmitted by the cloud 8 is received by the receiving unit 113 with a threshold value. For example, if this interval is below the threshold value, the second transmitting unit 115 determines that the message received by the receiving unit 113 has been transmitted by the cloud 8 due to transmission by the first transmitting unit 112.

If the message transmitted by the cloud 8 contains a user ID, this determination may be performed by comparing the user ID contained in the message with the user ID recorded in the history information 121. For example, if the user ID contained in the message is identical to the user ID recorded in the history information 121, the second transmitting unit 115 determines that the message received by the receiving unit 113 has been transmitted by the cloud 8 due to transmission by the first transmitting unit 112.

In the case where the second transmitting unit 115 determines that the message received by the receiving unit 113 has been transmitted by the cloud 8 due to transmission by the first transmitting unit 112, the second transmitting unit 115 uses the communication line 4 (first line) to transmit the unique information to the cloud 8 via the first communication unit 13a.

In this configuration, the image reading apparatus 1 independently exchanges information with the cloud 8. In this configuration, the image reading apparatus 1 that transmits identification information and authentication information to the cloud 8 also serves as a target apparatus to which a message specified by the cloud 8 based on possession information and containing unique information is to be transmitted. Accordingly, the image reading apparatus 1 determines whether or not the received message has been transmitted by the cloud 8 due to transmission of the identification information and the authentication information by the image reading apparatus 1, and performs a process in accordance with the determination result, thereby reducing the load on the operation performed by the user.

2.2. Second Modification

In the above exemplary embodiment and the first modification, the acquiring unit 114 extracts and acquires the unique information from the message received by the receiving unit 113. The method of acquiring the unique information by the acquiring unit 114 is not limited to this method. The acquiring unit 114 may acquire the unique information from the message in accordance with an operation performed by the user.

For example, when the receiving unit 113 receives a message from the cloud 8, the presenting unit 116 shown in FIG. 12 may present this message to the user. In this case, the accepting unit 111 may receive, from the user, an operator for specifying the unique information contained in the message presented by the presenting unit 116.

Figure 13:
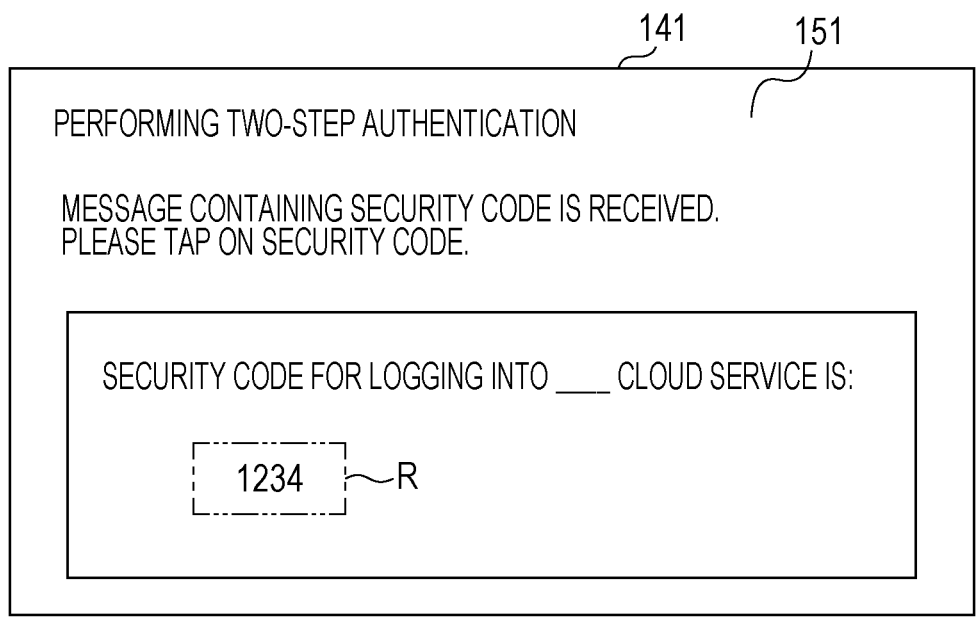
FIG. 13 illustrates an example of an image that a presenting unit causes a display screen to display.

FIG. 13 illustrates an example of an image that the presenting unit 116 according to a second modification causes the display screen 141 to display. In the above exemplary embodiment, the format of the message transmitted by the cloud 8 is a format preregistered in the image reading apparatus 1 and is interpretable by the image reading apparatus 1. However, the format of the message transmitted by the cloud 8 may change due to a change in specifications. Therefore, this message is not always interpretable by the image reading apparatus 1a, and it may sometimes be difficult to extract the unique information from the message.

The presenting unit 116 causes the display screen 141 to display the image shown in FIG. 13. In addition to the text "PERFORMING TWO-STEP AUTHENTICATION", this image contains the following command text to the user: "MESSAGE CONTAINING SECURITY CODE IS RECEIVED. PLEASE TAP ON SECURITY CODE.". The term "security code" refers to the aforementioned unique information. As shown in FIG. 13, the aforementioned message is displayed below this command text by being surrounded by a frame.

The user checks the image in FIG. 13 displayed on the display screen 141 and recognizes that an area expressed with four numerals "1234" indicates the security code (unique information) in the message surrounded by the frame. Therefore, the user performs a "tapping operation" by touching anywhere in a region R overlapping the area displaying the numerals "1234" on the touchscreen 151. The accepting unit 111 receives this operation.

Then, the acquiring unit 114 acquires, from the message, unique information specified in accordance with the operation received by the accepting unit 111. For example, the acquiring unit 114 extracts a region where text displayed at the position touched by the user is surrounded by a predetermined delimiter as unique information. Thus, the acquiring unit 114 extracts the region R when the user touches anywhere within the region R. In this case, the presenting unit 116 may display the extracted region R in a so-called highlighted mode in which the background color thereof is changed to a color different from the other regions.

For example, when the user brings his/her finger into contact with the position where the numeral "3" of the numerals "1234" is displayed on the display screen 141, the touchscreen 151 detects this contact and transmits a detection signal to the control unit 11. The control unit 11 receives the detection signal from the touchscreen 151 and determines that the text character touched by the user is the numeral "3". Then, the control unit 11 searches for delimiters near the numeral "3" and detects a space character immediately in front of the numeral "1" and a line feed character immediately behind the numeral "4". Accordingly, the control unit 11 extracts the aforementioned numerals "1234" as a group of unique information from the message.

In this configuration, even if the format of the message changes due to a change in specifications, the message is presented to the user, and the user recognizes the position of the unique information contained in the message and notifies the image reading apparatus 1 of the recognized position, whereby the unique information is acquired in the image reading apparatus 1 as a result of this operation.

2.3. Third Modification

The control unit 11a according to the first modification may function as a converting unit 119 indicated by a dash line in FIG. 12. The converting unit 119 performs conversion on the format of the message received by the receiving unit 113. In this case, the acquiring unit 114 may acquire the unique information from the message having undergone the conversion performed by the converting unit 119. For example, the converting unit 119 performs a speech recognition process using a hidden Markov model on a message expressed with a speech signal indicating a speech waveform, so as to convert the format of the message from the speech signal to a text signal. The conversion performed on the format of the message by the converting unit 119 is not limited to the speech-to-text conversion described above.

For example, the cloud 8 transmits a message containing unique information as a speech signal to the image reading apparatus 1a. The image reading apparatus 1a has the function of interpreting a text signal indicating text but does not have the function of extracting unique information from a speech signal. In this case, the control unit 11 or the control unit 11a functions as the converting unit 119 so as to convert a message expressed with a speech signal into a message expressed with a text signal.

The acquiring unit 114 may extract and acquire the unique information from the message expressed with the text signal. Furthermore, the acquiring unit 114 may cause the display screen 141 of the display unit 14 to display the message expressed with the text signal, and may receive an operation performed by the user in response to this message so as to acquire the unique information in accordance with this operation.

The receiving unit 113 may detect the format of the received message and may determine whether or not the detected format is interpretable by the acquiring unit 114 and whether or not the format is convertible by the converting unit 119. Then, if the detected format of the message is not interpretable by the acquiring unit 114 and the format is convertible by the converting unit 119, the receiving unit 113 may cause the converting unit 119 to perform conversion on the format of this message.

Figure 14A:
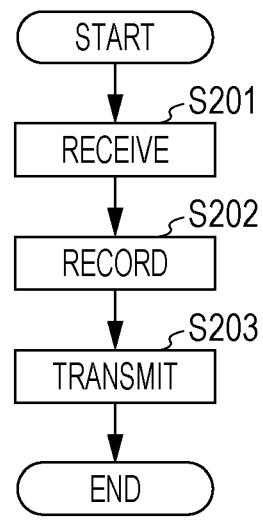
FIGS. 14A and 14B are flowcharts illustrating the flow of operation performed by the control unit.
Figure 14B:
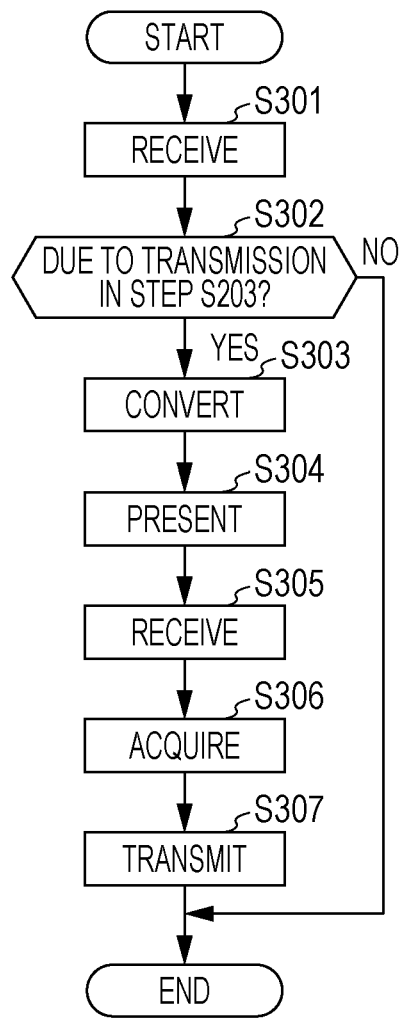

FIGS. 14A and 14B are flowcharts illustrating the flow of operation performed by the control unit 11a according to the third modification. As shown in FIG. 14A, when the user operates the touchscreen 151 of the operation unit 15 and inputs his/her user ID and password, the control unit 11a receives this operation in step S201, records the user ID and the password into the history information 121 in step S202, and transmits the user ID and the password to the cloud 8 via the communication line 4 in step S203.

When the control unit 11a receives a message from the cloud 8 via the communication line 5 in step S301, the control unit 11a determines in step S302 whether or not the received message has been transmitted from the cloud 8 due to the transmission in step S203.

If it is determined that the received message is not due to the aforementioned transmission (NO in step S302), the control unit 11a ends the process.

If it is determined that the received message is due to the aforementioned transmission (YES in step S302), the control unit 11a converts the format of the message from, for example, speech to text in step S303 and presents the text-converted message to the user in step S304 by causing the display screen 141 to display the message, as shown in FIG. 13.

When the user viewing this display screen 141 touches the touchscreen 151 and specifies a security code (unique information) contained in the presented message, the control unit 11a receives this operation in step S305. Then, the control unit 11a acquires the security code specified as a result of the received operation in step S306 and transmits the acquired security code to the cloud 8 via the communication line 4 in step S307.

In this configuration, even if the format of the message remains as-is and is not interpretable by the image reading apparatus 1a or is not presentable, the image reading apparatus 1a performs conversion on the format of this message so that the message having undergone the conversion is interpreted or presented.

2.4. Fourth Modification

In the above exemplary embodiment and the modifications, in a case where the image reading apparatus 1 or the image reading apparatus 1a determines that the received message has been transmitted by the cloud 8 due to transmission of identification information and authentication information by the server apparatus 2 or the image reading apparatus 1 or 1a, the image reading apparatus 1 or 1a transmits the acquired unique information to the cloud 8 via the first line. Alternatively, if the image reading apparatus 1 or 1a determines that the received message is not due to the aforementioned transmission, the image reading apparatus 1 or 1a may perform a predetermined process.

For example, if it is determined that the received message is not transmitted by the cloud service due to transmission by the first transmitting unit 112, the accepting unit 111 may receive a command from the user for permitting transmission of the unique information to the cloud service. Then, when the accepting unit 111 receives this command, the second transmitting unit 115 may transmit the unique information to the cloud 8.

In this configuration, for example, in a case where the user uses an apparatus different from the image reading apparatus 1 to transmit his/her user ID and password to the cloud 8, and the user desires to use the cloud service provided by the cloud 8 to cause the image reading apparatus 1 to execute a process, two-step authentication is performed by receiving permission of the user.

2.5. Fifth Modification

In the above exemplary embodiment, the control unit 11 controls the image reading apparatus 1 having the reading unit 16. Alternatively, the control unit 11 may control various types of information processing apparatuses, such as an image forming apparatus, a portable telephone, a personal computer (PC), a slate PC, or a tablet PC.

2.6. Sixth Modification

The program to be executed by the control unit 11 of the image reading apparatus 1, the control unit 11a, or the control unit 21 of the server apparatus 2 may be provided by being stored in a computer readable storage medium, which includes a magnetic storage medium, such as a magnetic tape or a magnetic disk, an optical storage medium, such as an optical disk, a magneto-optical storage medium, and a semiconductor memory. Alternatively, this program may be downloaded via a communication line, such as the Internet. As an alternative to a CPU as a control unit exemplified by the control unit 11, the control unit 11a, or the control unit 21 described above, various types of devices are applicable. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   memory;
   at least one processor that:
      receives identification information used by a cloud service for identifying a user and authentication information used for authenticating the user;
      records the identification information and the authentication information in the memory; and
      transmits the identification information and the authentication information to the cloud service via a first line; and
   a receiver that receives a message transmitted to the information processing device from the cloud service via a second line that is separate from the first line,
   wherein the at least one processor further
      acquires unique information contained in the message; and
      compares contents of the message with the recorded authentication information and the recorded identification information stored in the memory to determine if the message was transmitted by the cloud service to the receiver based on the at least one processor first transmitting the identification information and the authentication information to the cloud service via the first line;
      transmits the unique information to the cloud service via the first line in response to determining that the message was transmitted by the cloud service to the receiver based on the at least one processor first transmitting the identification information and the authentication information to the cloud service via the first line.

2. The information processing device according to claim 1,
   wherein the at least one processor extracts and acquires the unique information from the message, and
   wherein the at least one processor transmits the extracted unique information.

3. The information processing device according to claim 1, further comprising:
   a at least one processor that presents the message to the user,
   wherein the at least one processor receives, from the user, an operation for specifying the unique information contained in the message presented by the at least one processor, and
   wherein the at least one processor acquires, from the message, the unique information specified as a result of the operation received by the at least one processor.

4. The information processing device according to claim 2, further comprising:
   a at least one processor that converts a format of the message received by the at least one processor,
   wherein the at least one processor acquires the unique information from the message the format of which is converted by the at least one processor.

5. The information processing device according to claim 1,
   wherein the at least one processor receives, from the user, a command for permitting transmission of the unique information to the cloud service in a case where the message is not transmitted by the cloud service due to transmission by the at least one processor, and
   wherein the at least one processor transmits the unique information in a case where the at least one processor receives the command.

6. An image reading apparatus comprising:
   a at least one processor that reads an image formed on a medium; and
   the information processing device according to claim 1 that processes information indicating the read image.

7. An information processing system comprising:
   an information processing device; and
   a server,
   wherein the information processing device includes
      at least one processor that:
         receives identification information used by a cloud service for identifying a user and authentication information used for authenticating the user;
         forwards the identification information and the authentication information to the server; and
      a receiver that receives a message transmitted to the information processing device from the cloud service via a second line that is separate from the first line,
   wherein the server is configured to:
      transmit the identification information and the authentication information forwarded from the information processing device to the cloud service via a first line;
   wherein the at least one processor the information processing device or the server is configured to:
      record the identification information and the authentication information in memory prior to the message being transmitted from the cloud service; and
      acquire unique information contained in the message; and
      compare contents of the message with the recorded authentication information and the recorded identification information stored in the memory to determine if the message was transmitted by the cloud service to the receiver based on the at least one processor first transmitting the identification information and the authentication information to the cloud service via the first line;
      transmit the unique information to the cloud service via the first line in response to determining that the message was transmitted by the cloud service to the receiver based on the at least one processor first transmitting the identification information and the authentication information to the cloud service via the first line.

8. A non-transitory computer readable medium storing a program causing a computer to execute a process, the process comprising:
   receiving identification information used by a cloud service for identifying a user and authentication information used for authenticating the user;
   recording the identification information and the authentication information in the memory;
   performing first transmission for transmitting the identification information and the authentication information to the cloud service via a first line that is separate from the first line;
   receiving a message transmitted from the cloud service via a second line;
   acquiring unique information contained in the message;
   comparing contents of the message with the recorded authentication information and the recorded identification information stored in the memory to determine if the message was transmitted by the cloud service to the receiver based on the at least one processor first transmitting the identification information and the authentication information to the cloud service via the first line; and
   performing second transmission for transmitting the unique information to the cloud service via the first line in a case where the message is transmitted by the cloud service due to the first transmission.

9. The information processing device according to claim 1, wherein the cloud service records the unique information in memory in the cloud service prior to transmitting the unique information to the receiver of the information processing device, and
   wherein the cloud service receives and compares the unique information back from the information processing device with the previously-recorded unique information stored in the cloud service memory, and upon determining a match exists based on the comparison, the user is authenticated.

* * * * *